(12) United States Patent
Andoh

(10) Patent No.: US 9,628,763 B2
(45) Date of Patent: Apr. 18, 2017

(54) LIGHT EMITTING DEVICE AND IMAGE FORMING APPARATUS

(71) Applicant: Takayuki Andoh, Kanagawa (JP)

(72) Inventor: Takayuki Andoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 60 days.

(21) Appl. No.: 14/289,903

(22) Filed: May 29, 2014

(65) Prior Publication Data

US 2014/0369046 A1 Dec. 18, 2014

(30) Foreign Application Priority Data

Jun. 12, 2013 (JP) .................................. 2013-123716

(51) Int. Cl.
| | |
|---|---|
| *F21V 17/02* | (2006.01) |
| *H04N 9/00* | (2006.01) |
| *G03B 21/00* | (2006.01) |
| *B41J 29/42* | (2006.01) |
| *G03G 15/00* | (2006.01) |
| *G03G 21/16* | (2006.01) |
| *H04N 1/00* | (2006.01) |
| *B41J 29/13* | (2006.01) |

(52) U.S. Cl.
CPC ................ *H04N 9/00* (2013.01); *B41J 29/13* (2013.01); *B41J 29/42* (2013.01); *G03B 21/00* (2013.01); *G03G 15/00* (2013.01); *G03G 21/1633* (2013.01); *H04N 1/00519* (2013.01); *G03G 21/1638* (2013.01)

(58) Field of Classification Search
CPC .. F21V 21/34; F21V 5/00; H04N 9/00; G03B 21/00
USPC .......................................................... 362/282
See application file for complete search history.

(56) References Cited

U.S. PATENT DOCUMENTS 4,235,543 A * 11/1980 Norris .............................. 396/31
2010/0110509 A1* 5/2010 Cui et al. ........................ 358/498

FOREIGN PATENT DOCUMENTS

| | | |
|---|---|---|
| JP | 10-026906 | 1/1998 |
| JP | 2011-158866 | 8/2011 |
| JP | 2012-010137 | 1/2012 |

* cited by examiner

*Primary Examiner* — Andrew Coughlin
*Assistant Examiner* — Meghan Ulanday
(74) *Attorney, Agent, or Firm* — Harness, Dickey & Pierce, P.L.C.

(57) ABSTRACT

A light-emitting device for use in an image forming apparatus includes an apparatus body; a door disposed on and openably closable relative to the apparatus body; a lens mounted on the door; a light-emitting element that lights up the lens with light; and a bracket disposed on the apparatus body, configured to support the light-emitting element. The bracket is slidable in a direction in which the light-emitting element emits light. In a state in which the door is closed relative to the apparatus body, the bracket contacts at least one of a part of the door and a part of the lens, further movement of the bracket in the slidable direction is obstructed, and the light-emitting element and the lens are positioned adjacent to each other.

6 Claims, 6 Drawing Sheets

LIGHT EMITTING DEVICE AND IMAGE FORMING APPARATUS

CROSS-REFERENCE TO RELATED APPLICATION

The present application claims priority pursuant to 35 U.S.C. §119(a) from Japanese patent application number 2013-123716, filed on Jun. 12, 2013, the entire disclosure of which is incorporated by reference herein.

BACKGROUND

Technical Field

Exemplary aspects of the present disclosure relate to a light-emitting device.

Related Art

Certain types of image forming apparatuses alert a user to a paper jam by lighting up a lens disposed at a position where the paper jam is occurring with a light-emitting diode (LED). Such an image forming apparatus includes an LED and a lens disposed on an openably closable door. When the door is closed, the lens is lit up via the LED.

Similarly, certain image forming apparatuses alert a user to recognize a paper tray currently in use by lighting up a lens disposed in front of the target paper tray with the LED. Such an image forming apparatus includes the LED and the lens disposed on the side of the tray. The lens is lit up by the LED when the tray is closed.

However, when the LED and the lens are disposed in the above configuration, because both of the LED and the lens are fixed, the LED and the lens may contact each other when the door or the tray is open or closed. When the LED and the lens collide, the LED and the lens may be broken or damaged. Thus, considering variations in overstroke and the dimensional tolerances of the parts when the door or the tray is closed, at least 3 to 4 mm of separation between the LED and the lens is required lest the LED and the lens collide.

However, keeping that separation between the LED and the lens dissipates the light from the LED, necessitating an increase in power supplied to the LED. If the electric current to be supplied to the LED is increased, energy consumption also increases, so that the energy-saving effect of the LED is dissipated. Thus, a scheme to reduce the dissipation or loss of light from the LED becomes necessary.

JP-2011-158866-A discloses a technology including means to turn the LED on and off to identify a position of a device to be accessed by a user and to turn on the LED in the order of access if there are many points requiring the user's attention, to thus prompt a user to access each point in order.

However, the same does not describe a problem of loss of light amount in the light-emitting device such as an LED and no related technology is disclosed.

SUMMARY

In one embodiment of this disclosure, there is provided a light-emitting device for use in an image forming apparatus, that includes an apparatus body; a door disposed on and openably closable relative to the apparatus body; a lens mounted on the door; a light-emitting element that lights up the lens with light; and a bracket disposed on the apparatus body, configured to support the light-emitting element. The bracket is slidable in a direction in which the light-emitting element emits light. In a state in which the door is closed relative to the apparatus body, the bracket contacts at least one of a part of the door and a part of the lens, further movement of the bracket in the slidable direction is obstructed, and the light-emitting element and the lens are positioned adjacent to each other.

In one embodiment of this disclosure, there is provided an image forming apparatus including the above-described light-emitting device.

These and other objects, features, and advantages of the present invention will become apparent upon consideration of the following description of the preferred embodiments of the present invention when taken in conjunction with the accompanying drawings.

DETAILED DESCRIPTION

Hereinafter, a light-emitting device according to one aspect of the present disclosure will be described referring to accompanying drawings, beginning with the image forming apparatus including the light-emitting device.

Figure 1:
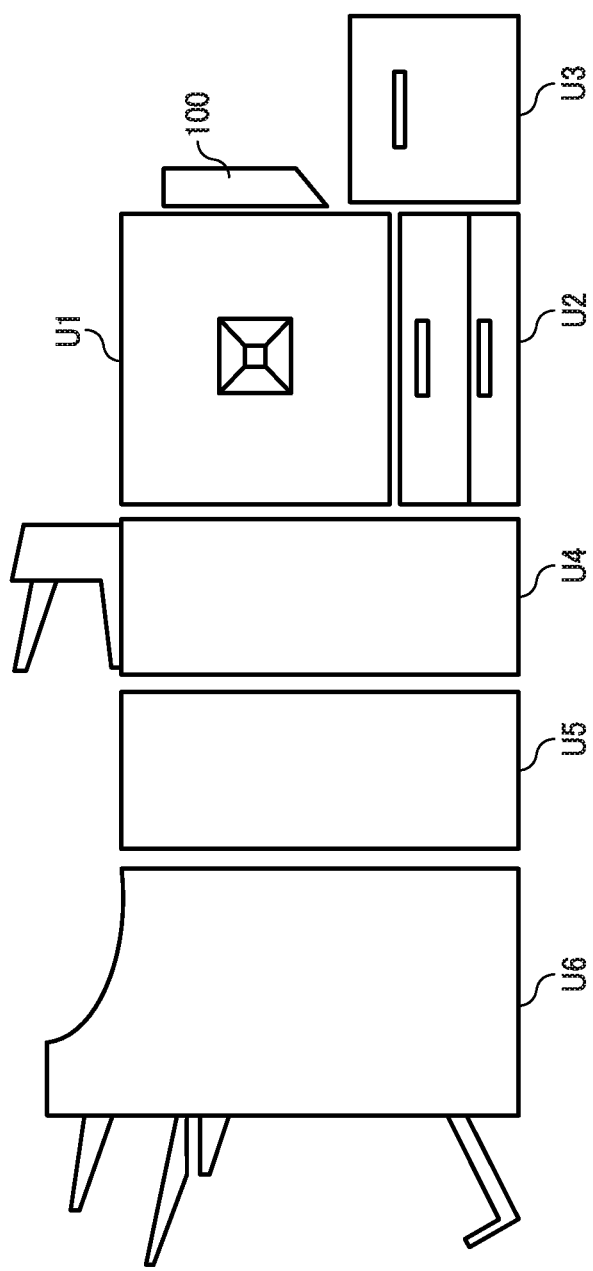
FIG. 1 is a schematic configuration of an image forming apparatus according to an embodiment of the present invention.

FIG. 1 is a schematic configuration of an image forming apparatus. The image forming apparatus according to the present embodiment includes a plotter U1, paper trays U2 and U3, and post-processors U4, U5, and U6. The image forming apparatus further includes an openably closable door 100 relative to the apparatus body 200.

The plotter U1 is constructed of, for example, an electro-photographic recording device or an inkjet recording device, each of which outputs image data on a sheet of paper (hereinafter, simply referred to as "sheet(s)"). The plotter U1 conveys the printed sheet of paper to the post-processors U4, U5, and U6.

The paper trays U2 and U3 contain multiple sheets, on which images are transferred.

The paper trays U2 and U3 include, for example, a paper storage U2 of a relatively small size connected to the plotter U1 and disposed below the plotter U1, and a large-volume paper storage U3 connected to the plotter U1 disposed in parallel with the plotter U1.

These paper trays U2 and U3 includes multiple paper trays each containing different size of sheets, each of which is conveyed to the plotter U1. Each storage or tray contains the same size of sheets.

The post-processors U4, U5, and U6 perform post processing to each sheet discharged from the plotter U1.

The post-processors U4, U5, and U6 include, for example, an inserter to insert covers or chapter separators into documents, a punching machine for punching, and a paper folder to fold each sheet for making a book. Further, examples of post-processors include a stapler for stapling sheets, a bookbinding device for tape bookbinding, ring bookbinding, and sure bookbinding, and a trimmer to trim multiple sheets in the bound book according to a predetermined final size.

Further, the post-processors U4, U5, and U6 include a consumable supplies container, not shown. The consumable supplies container contains a consumable such as staples for the stapler, adhesives for bookbinding, tapes for tape bookbinding, rings for ring bookbinding, bind strips for sure bookbinding, and the like.

In addition, in the stapling process, when the staples are cut in accordance with the number of bound sheets, staple waste is generated. In the punching process, when the sheets are punched, punch waste remains. Further, in the bookbinding, trimming waste is generated in the three-sided trimming and milling process. A waste collection unit, not shown, to collect waste such as staple waste, punch waste, and trimming waste, is disposed.

Further, the image forming apparatus according to the present embodiment may include an automatic document feeder (ADF) to convey an original set on a platen to a reading position; a scanner to read the image data of the original; and an operation section including a control panel that includes various keys such as ten keys, a start key, function keys, one-touch keys, and the like, and a liquid crystal display (LCD).

The image forming apparatus according to the present embodiment includes LEDs appropriately disposed at sheet removal points, discharge trays, sheet-feed trays, consumables/waste storage units, and the like.

By varying a color of the light of the LED, users can recognize a malfunction in image forming apparatus visually and understand the point of operation and the status of operation during printing.

Other than the above, the LED includes the following functions.

<LED at the Paper Tray>

The LED at the paper tray indicates a currently used paper tray relative to a print operation that the user designates. Lighting of the LED represents a paper tray under operation on which the operating system is activated, and blinking of the LED represents out-of-stock condition of the paper in the subject paper tray, that is, indicating the paper tray to which sheets of paper needs to be supplied.

<Sheet Discharge LED>

The sheet discharge LED shows a destination in the post processor currently in use for the printing. Users can recognize a status of the sheet discharge destination according to the status of the LED. For example, the users can confirm where the sheet is discharged to and which post processor is being used. When the system previously recognizes or detects that the sheet discharge destination is full of sheets, the system causes the LED to blink, thereby prompting the user to have an access the point guided by the blinking of the LED.

<Remaining Sheet/Abnormality Occurrence and Removal LED>

The remaining sheet/abnormality occurrence and removal LED notifies the user that a paper jam occurs during printing and removal of the jammed sheet is necessary by lighting the LED at a jam occurring position. Then, when the paper jam is removed and if further, the paper jam removal is needed, the LED guides the user by lighting and blinking the LED to the position for which a next operation is required.

<Waste/consumables LED>

When needles for the stapler is out of stock or the punch waste is full, the waste/consumable LED indicates positions that require user operation by lighting/blinking the LED indicating the unit for which supply or replacement is required.

<Configuration Of LED Mounting>

Next, an exemplary configuration of the LED mounted on the image forming apparatus will be described referring to FIGS. 2 and 3.

Figure 2:
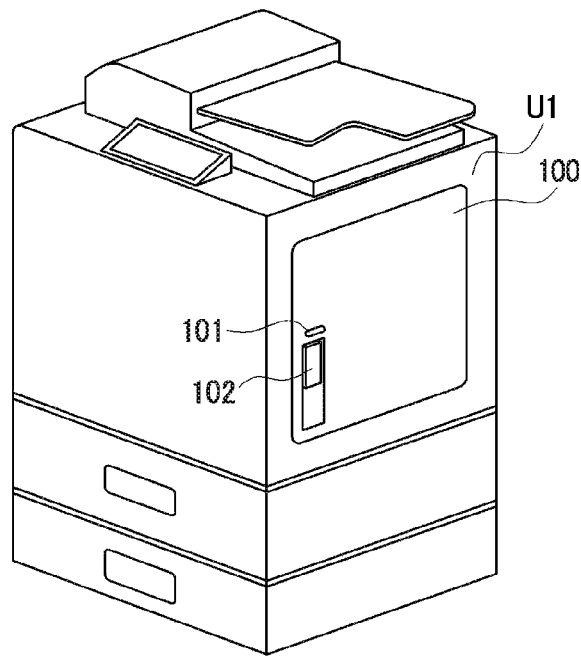
FIG. 2 is a schematic view of the image forming apparatus on which an LED is mounted.
Figure 3:
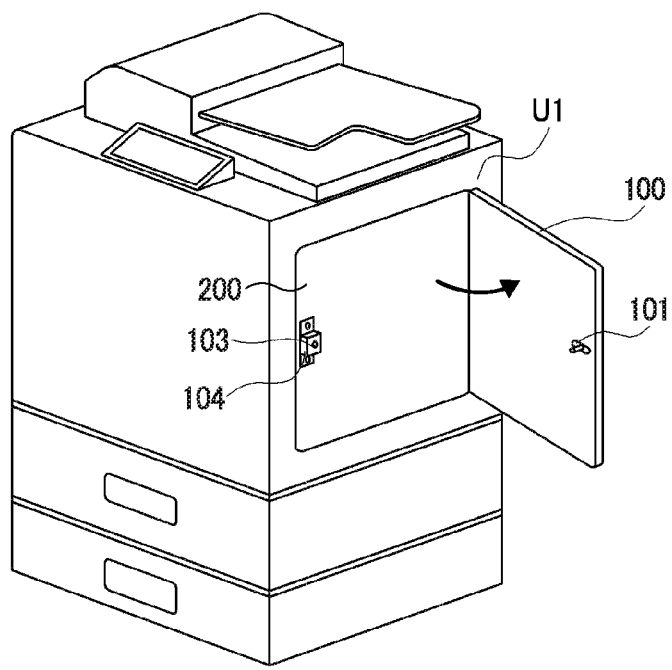
FIG. 3 is another schematic view of the image forming apparatus when the door is open.

FIGS. 2 and 3 are views each illustrating exemplary configuration of the LED; FIG. 2 shows a state in which a door 100 of the plotter U1 is closed; and FIG. 3 shows a state in which the door 100 is open. When a paper jam occurs in the plotter U1 during printing as illustrated in FIG. 2, the door 100 is open to remove the jammed sheet as illustrated in FIG. 3. As illustrated in FIGS. 2 and 3, a lens 101, an LED 103, and a bracket 104 form a light-emitting device.

When a paper jam occurs during printing, the LED 103 disposed on the apparatus body 200 emits light to the lens 101 disposed on the door 100. The lens 101 lights up to alert the user that a jam removal process is necessary. The user opens the door 100 by pressing a lock release button 102 disposed near the lighting lens 101. FIG. 3 is a view illustrating a state in which the door 100 is open.

As illustrated in FIG. 3, the LED 103 is mounted on the bracket 104 disposed on the apparatus body 200. The bracket 104 is fixed to the apparatus body 200 via screws. Thus, the LED 103 is mounted on the apparatus body 200.

Figure 4:
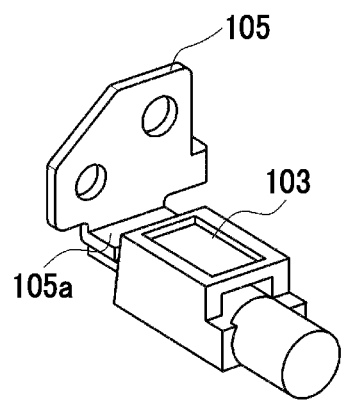
FIG. 4 is a view illustrating a mounting device for mounting the LED on the image forming apparatus.

When mounting the LED 103 to the bracket 104, for example, as illustrated in FIG. 4, an insertion portion 105a of the mounting member 105 is inserted into a hole of the LED 103 and the LED 103 is held by the mounting member 105. Then, the mounting member 105 is fixed to the bracket 104 via screws. Positions to fix the mounting member 105 to the bracket 104 are implemented by positioning holes, through which screws are inserted to fix the mounting member 105 to the bracket 104. The mounting member 105 is formed of a metal plate, and the like. FIG. 4 is a view illustrating the mounting member 105 for mounting the LED to the image forming apparatus.

<Configuration of Background Art LED>

To further aid in an understanding of the distinctive technical features of the present embodiment, a configuration of the light-emitting device according to background art will be described with reference to FIG. 5.

Figure 5:
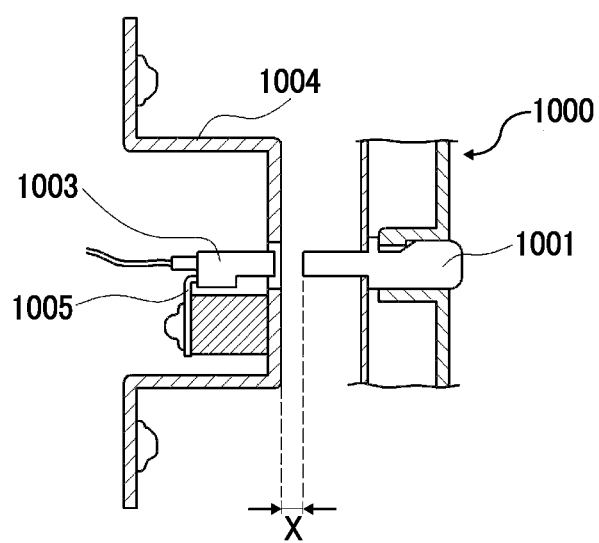
FIG. 5 is a view illustrating a background-art light-emitting device configuration.

FIG. 5 is a view illustrating an exemplary configuration of a light-emitting device according to the background art. In the background art light-emitting device, an LED 1003 is disposed on the apparatus body and a lens 1001 is disposed on a door 1000. The LED 1003 and the lens 1001 are both fixed.

The LED 1003 is supported by a mounting member 1005 and the mounting member 1005 is mounted on a bracket 1004, so that the LED 1003 is held by the bracket 1004 and is mounted on the body of the image forming apparatus. The bracket 1004 is fixed to the apparatus body via screws.

Accordingly, the LED 1003 is fixed to the apparatus body. The lens 1001 is fixed to the door 1000. As a result, the lens 1001 is fixed to the door 1000.

When the LED 1003 and the lens 1001 are both disposed fixed, there may be a case in which the lens 1001 and the LED 1003 contact each other when the door 1000 is opened or closed, thereby damaging the LED 1003 and the lens 1001. Thus, considering variations in overstroke and dimensional tolerances of the parts, a predetermined distance X is provided between the lens 1001 and the LED 1003 in a state in which the door 1000 is closed according to the background-art fixing device. In this case, the predetermined distance X is 3 to 4 mm.

Figure 6:
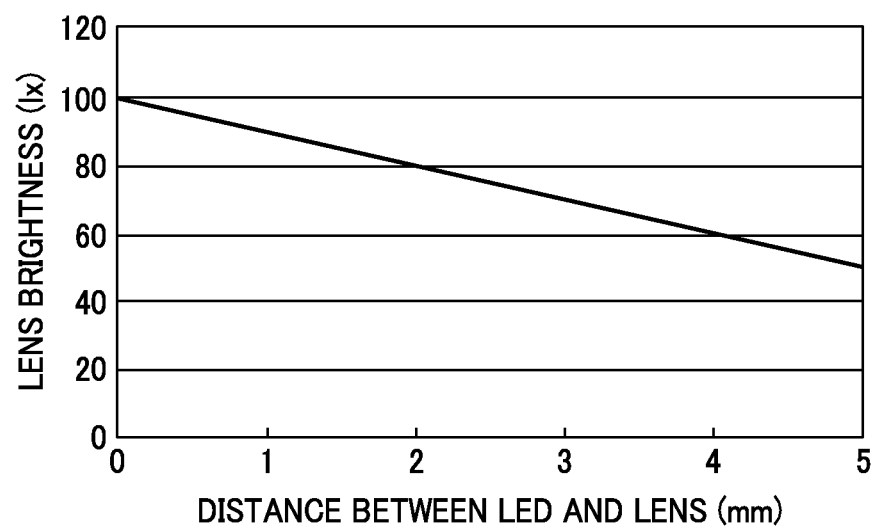
FIG. 6 is a graph showing a relation between the brightness of the lens and the distance between the LED and the lens.

The lens becomes brighter, as illustrated in FIG. 6, the distance between the LED and the lens is narrower. By contrast, when the distance between the LED and the lens is greater, the lens becomes darker. FIG. 6 is a graph showing a relation between the brightness of the lens and the distance between the LED and the lens. The distance between the LED and the lens is narrower because a smaller separation results in less dissipation or loss of light. The graph in FIG. 6 is an example, though the brightness of the lens may vary due to other reasons such as the shape of the lens.

As is apparent from the graph in FIG. 6, it is preferred that the distance between the LED and the lens be narrower to make the lens to shine more brightly. However, because the predetermined distance X should be provided with the background-art configuration of the light-emitting device as illustrated in FIG. 5, electric current supplied to the LED 1003 should be increased in order to make the lens 1001 brighter. When the electric current supplied to the LED is increased, energy consumption of the LED 1003 also increases, dissipating the energy-saving effect of the LED.

Figure 7:
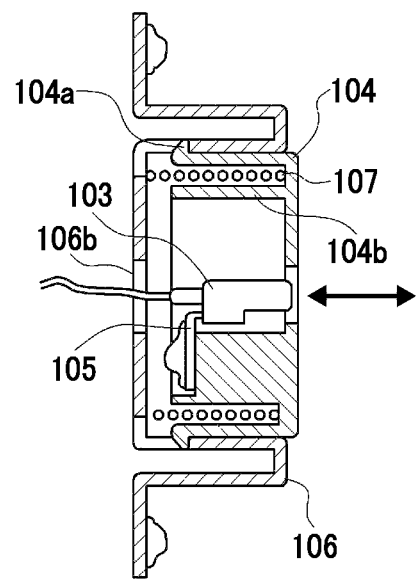
FIG. 7 is a view illustrating an exemplary configuration of a light-emitting device according to the embodiment of the present invention.
Figure 8:
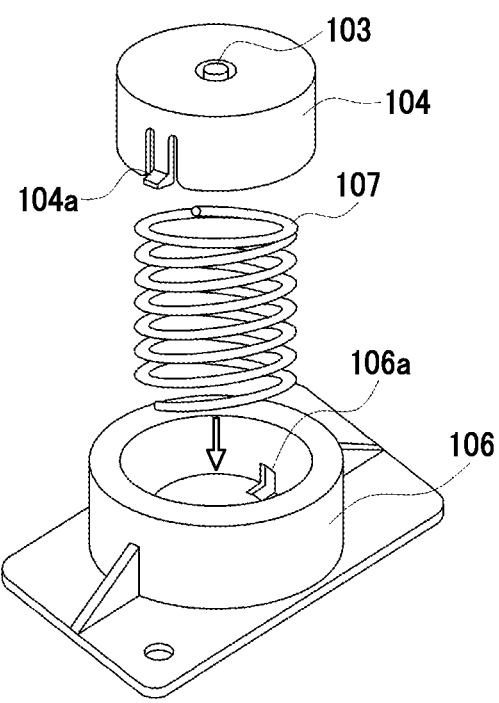
FIG. 8 is an exploded perspective view illustrating a portion around the light-emitting device according to the embodiment of the present invention.
Figure 9:
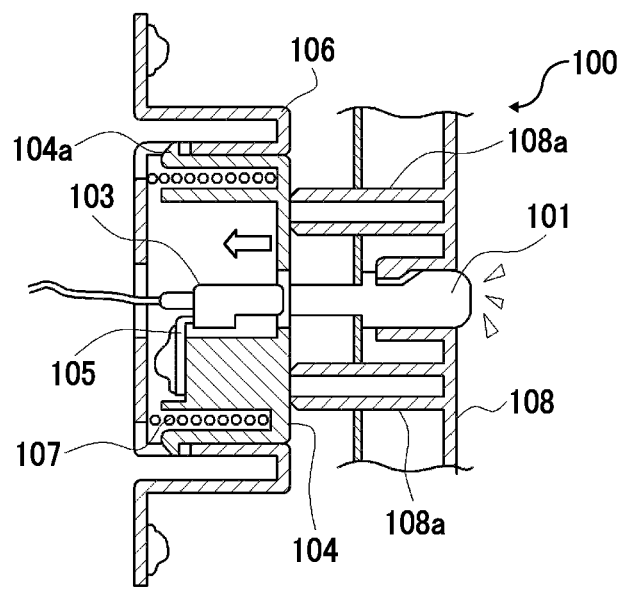
FIG. 9 is a view illustrating another exemplary configuration of the light-emitting device according to the embodiment of the present invention.

As illustrated in FIGS. 7 to 9, the light-emitting device according to the present embodiment is configured such that the bracket 104 supporting the LED 103 is movable by a predetermined distance in the radiation direction from the LED 103.

FIGS. 7 to 9 are views each illustrating an exemplary configuration of the LED. FIG. 7 shows an exemplary configuration around the portion supporting the LED 103 when the door 100 is open. FIG. 8 is an exploded perspective view of the LED-supporting portion. FIG. 9 shows an exemplary configuration around the portion supporting the LED 103 when the door 100 is closed.

The LED-supporting portion is constructed of a case 106, a bracket 104, a mounting member 105, and a spring 107.

The bracket 104 is pressed in the radiation direction of the LED 103 via an elastic member such as the spring 107. As illustrated in FIG. 9, when the door 100 is closed, the bracket 104 contacts the door 100 and the position thereof in the direction of thrust is obstructed.

The thrust direction of the bracket 104 is the direction in which the bracket 104 slidably moves and the radiation direction of the LED 103.

In the light-emitting device according to the present embodiment, because the bracket 104 is simply pressed by the spring 107, there is no need to consider the overstroke when the door 100 is closed or dimensional tolerances of the parts and components. Accordingly, the distance between the LED 103 and the lens 101 is shortened than in the background art. As a result, dissipation or loss of light from the LED 103 is reduced, thereby reducing energy consumption of the LED 103. In the conventional light-emitting device as illustrated in FIG. 5, separation X is provided between the lens 1001 and the LED 1003. By contrast, in the light-emitting device according to the present embodiment as illustrated in FIG. 9, the distance between the lens 101 and the LED 103 can be shortened than the above distance X.

<Configuration of Light-Emitting Device>

Next, referring to FIGS. 7 to 9, a configuration of the light-emitting device according to the present embodiment will be described.

The light-emitting device according to the present embodiment is configured such that the bracket 104 supporting the LED 103 is movable by separation along the radiation direction (as indicated by an arrow in FIG. 7) from the LED 103. The bracket 104 is pressed in the radiation direction of the LED 103 via the elastic member such as the spring 107. The bracket 104 includes a hook 104a and the case 106 includes a cutout 106a. When the hook 104a hangs on an edge of the cutout 106a, the bracket 104 stops moving. A shape of the hook 104a is arbitrary as far as the bracket 104 stops when the bracket 104 hangs on a part of the case 106.

The bracket 104 is cylindrical and the case 106 is formed as a cylindrical shape. Then, the bracket 104 is caused to engage with an interior side of the case 106. The outer diameter of the bracket 104 is smaller than the inner diameter of the case 106. As a result, when the bracket 104 is inserted into inside the case 106, the outer cylindrical circumference of the bracket 104 slidably moves along the inner circumference of the case 106. Thus, the bracket 104 can slide easily in the direction of the radiation from the LED 103.

As illustrated in FIG. 7, a slot 106b is disposed on the case 106. A harness from the LED 103 passes through the slot 106b and is connected to a control circuit board (not shown).

The spring 107 is disposed between the external wall constructing the outer cylindrical circumference of the bracket 104 and a rib 104b disposed inside the bracket 104. In the light-emitting device according to the present embodiment, the outer cylindrical circumference of the bracket 104 slidably moves along the inner circumference of the case 106 due to elastic force of the spring 107. In this case, the spring 107 and the bracket 104 are coaxially aligned. Thus, the bracket 104 can slide stably in the direction of the radiation from the LED 103. Further, because the spring 107 is shielded from the LED 103 by the rib 104b, the LED 103 is not damaged by the spring 107.

The LED 103 is supported by the mounting member 105 and the mounting member 105 is mounted on the bracket 104, so that the LED 103 is held by the bracket 104 and is mounted on the body of the image forming apparatus. A light emitting side of the LED 103 is exposed to the outside through a slot in the bracket 104. In addition, a center axis of the LED 103 and the center axis of the cylinder shape of the bracket 104 are coincident with each other. Thus, even though the bracket 104 rotates, the center axis of the LED 103 does not deviate, so that the light can be emitted to the lens 101 with a higher resolution.

When the door 100 is closed, an upper surface of the cylindrical bracket 104 contacts the door 100 and the position of the bracket 104 in the direction of thrust is obstructed.

In the configuration as illustrated in FIG. 9, a boss 108a disposed on a frame 108 of the door 100 contacts the upper surface of the cylindrical bracket 104. The boss 108a is a protrusion that protrudes from the frame 108. At this time, the bracket 104 has been pressed by the boss 108a since the state in which the door 100 is open as illustrated in FIG. 7, and the hook 104a is separate from the edge of the cutout 106a of the case 106 by a length pressed by the boss 108a. The boss 108a is preferably disposed in four directions around the lens 101.

Figure 10:
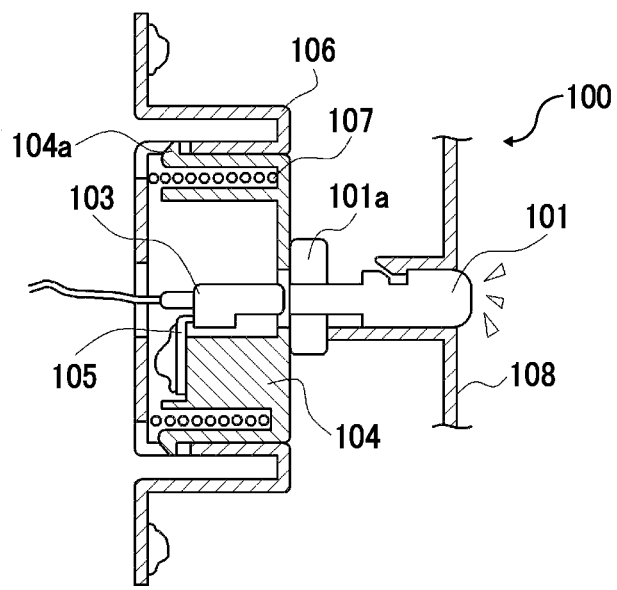
FIG. 10 is a view illustrating further another exemplary configuration of the light-emitting device according to the embodiment of the present invention.

In the configuration as illustrated in FIG. 10, a rib 101a disposed around the lens 101 contacts the upper surface of the cylindrical bracket 104. The rib 101a is a part disposed around an edge of the bracket 104 of the lens 101. The rib 101a is preferably disposed in four directions around the edge of the lens 101.

Further, provision of both the boss 108a and the rib 101a is possible in combination with the structures of FIGS. 9 and 10.

<Action and Effect of Light-Emitting Device>

Thus, in the light-emitting device according to the present embodiment, the LED 103 is supported by the bracket 104 and the bracket 104 is mounted on the case 106 of the apparatus body 200. In addition, the bracket 104 is so mounted on the case 106 of the apparatus body 200 as to be slidable along the light-emitting direction of the LED 103. Then, in a state in which the door 100 is closed with respect to the apparatus body 200, the bracket 104 contacts at least one of the boss 108a as a part of the door 100 and the rib 101a as a part of the lens 101, the position of the bracket 104 along the slidable direction is obstructed, so that the LED 103 and the lens 101 are proximally positioned. As a result, the distance between the LED 103 and the lens 101 is shorter than that of the light-emitting device in the background art. As a result, dissipation or loss of light from the LED 103 is reduced, thereby reducing the energy consumption of the LED 103.

The brightness of the lens 101 decreases even though the luminance of the LED 103 is the same as the distance between the LED 103 and the lens 101 becomes greater. When the LED 103 is disposed on the side of the image forming apparatus and the lens 101 is disposed on the door 100, if the distance between the LED 103 and the lens 101 is shortened when the door 100 is closed, the lens 101 becomes brighter with the luminance of the LED 103 remains the same, to thus obtain the full energy-saving effect of the LED 103.

In the conventional light-emitting device, considering variations in an overstroke or dimensions of the parts when the door 100 is closed, the predetermined distance of 3 to 4 mm should be secured, and due to its distance, loss of the light amount becomes large. By contrast, with the light-emitting device according to the present embodiment, because the bracket 104 is mounted slidably in the radiation direction from the LED 103, there is no need to consider the overstroke when the door 100 is closed. Further, because the variations in the distance between the LED 103 and the lens 101 due to dimensional tolerances of the parts decrease, the distance between the LED 103 and the lens 101 can be shortened. As a result, dissipation or loss of light from the LED 103 is reduced, thereby reducing the energy consumption of the LED 103.

The present invention is not limited to the embodiments described heretofore, but can be applied to other embodiments modified in a range without distorting from the concept of the present invention.

Additional modifications and variations of the present invention are possible in light of the above teachings. It is therefore to be understood that, within the scope of the appended claims, the invention may be practiced other than as specifically described herein.

What is claimed is:

1. A light-emitting device for use in an image forming apparatus, comprising:
   an apparatus body;
   a door on and openably closable relative to the apparatus body;
   a lens mounted on the door;
   a light-emitting element configured to light up the lens with light; and
   a bracket on the apparatus body, configured to support the light-emitting element,
   wherein the bracket is slidable in a direction in which the light-emitting element emits light,
   wherein the bracket separates from a part of the door in a state in which the door is open, and
   wherein, in a state in which the door is closed relative to the apparatus body, the bracket contacts at least one of a part of the door and a part of the lens, further movement of the bracket in the slidable direction is obstructed, and the light-emitting element and the lens are positioned adjacent to each other.

2. The light-emitting device as claimed in claim 1, wherein the lens is brought to be in a separate state from a close state to the light-emitting device when the door is open, and the bracket slides along the radiation direction.

3. The light-emitting device as claimed in claim 1, wherein the part of the door is a projection positioned around the lens and the part of the lens is a rib positioned around the lens.

4. The light-emitting device as claimed in claim 1, further comprising a case of the apparatus body,
   wherein the bracket is cylindrical and slidably inserted along an inner circumference of the case of the apparatus body, and
   wherein, in a state in which the door is closed relative to the apparatus body, an upper surface of the cylindrical bracket contacts at least one of the part of the door and the part of the lens.

5. The light-emitting device as claimed in claim 4, wherein the bracket includes an elastic member that is at an interior side of the bracket and applies pressure in the direction in which the light-emitting element emits light.

6. An image forming apparatus comprising a light-emitting device as claimed in claim 1.

* * * * *